(12) United States Patent
  Keith

(10) Patent No.: US 11,504,554 B2
(45) Date of Patent: Nov. 22, 2022

(54) FACEMASK-MOUNTED AUGMENTED REALITY DISPLAY FOR EXTRAVEHICULAR MOBILITY UNIT

(71) Applicant: Rockwell Collins, Inc., Cedar Rapids, IA (US)

(72) Inventor: Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/217,669

(22) Filed: Mar. 30, 2021

(65) Prior Publication Data
US 2021/0316167 A1    Oct. 14, 2021

Related U.S. Application Data

(60) Provisional application No. 63/009,514, filed on Apr. 14, 2020.

(51) Int. Cl.
  *A62B 18/08*  (2006.01)
  *G06F 3/16*  (2006.01)
  (Continued)

(52) U.S. Cl.
  CPC .............. *A62B 18/08* (2013.01); *A62B 18/02* (2013.01); *G02B 27/0172* (2013.01); *G02B 27/0179* (2013.01); *G02F 1/163* (2013.01); *G06F 3/012* (2013.01); *G06F 3/167* (2013.01); *G09G 5/377* (2013.01); *H04R 1/028* (2013.01); *H04R 1/08* (2013.01); *G02B 2027/0187* (2013.01);
  (Continued)

(58) Field of Classification Search
  CPC .... A62B 18/08; A62B 18/02; G02B 27/0172; G02B 27/0179; G02B 27/0176; G02B 27/0093; G02B 27/017; G02B 2027/0187; G02B 2027/0138; G02F 1/163; G02F 1/157; G06F 3/012; G06F 3/167; G06F 3/147; G06F 3/011; G09G 5/377; G09G 2340/12; G09G 2354/00; H04R 1/028; H04R 1/08; H04R 2499/15; B64G 6/00
  See application file for complete search history.

(56) References Cited

U.S. PATENT DOCUMENTS 5,033,818 A * 7/1991 Barr ........................ B63C 11/12
                                                         351/158
7,034,779 B2    4/2006 Ebersole, Jr.
(Continued)

FOREIGN PATENT DOCUMENTS

CN          109998213 A  *  7/2019

*Primary Examiner* — Brent D Castiaux
(74) *Attorney, Agent, or Firm* — Suiter Swantz pc llo

(57) ABSTRACT

A facemask-mounted augmented reality (AR) display device is disclosed. In embodiments, the display device is hard-mounted to a breathing apparatus (e.g., oxygen mask, smoke mask) fitted to a user's nose and mouth behind a partially or fully covering external face shield. The AR display system includes display surfaces aligned with the eyes of the user and capable of providing the user with a forward field of view that moves with the user's head. The AR display system synthesizes streaming images with additional overlay sources (e.g., mission data, position data) to generate augmented reality content presented to the user within the field of view of the display surfaces.

10 Claims, 6 Drawing Sheets

(51) Int. Cl.
  *G06F 3/01* (2006.01)
  *G09G 5/377* (2006.01)
  *G02B 27/01* (2006.01)
  *A62B 18/02* (2006.01)
  *H04R 1/08* (2006.01)
  *H04R 1/02* (2006.01)
  *G02F 1/163* (2006.01)

(52) U.S. Cl.
  CPC ..... *G09G 2340/12* (2013.01); *G09G 2354/00* (2013.01); *H04R 2499/15* (2013.01)

(56) References Cited

U.S. PATENT DOCUMENTS

| | | | |
|---|---|---|---|
| 10,204,453 B2 | 2/2019 | Sharma | |
| 2001/0049837 A1 | 12/2001 | Slack | |
| 2002/0053101 A1 | 5/2002 | Slack | |
| 2016/0044276 A1* | 2/2016 | Shearman | H04N 5/772 348/207.1 |
| 2018/0348529 A1* | 12/2018 | Blum | G02B 27/0172 |
| 2020/0001956 A1 | 1/2020 | Gauthier et al. | |

\* cited by examiner

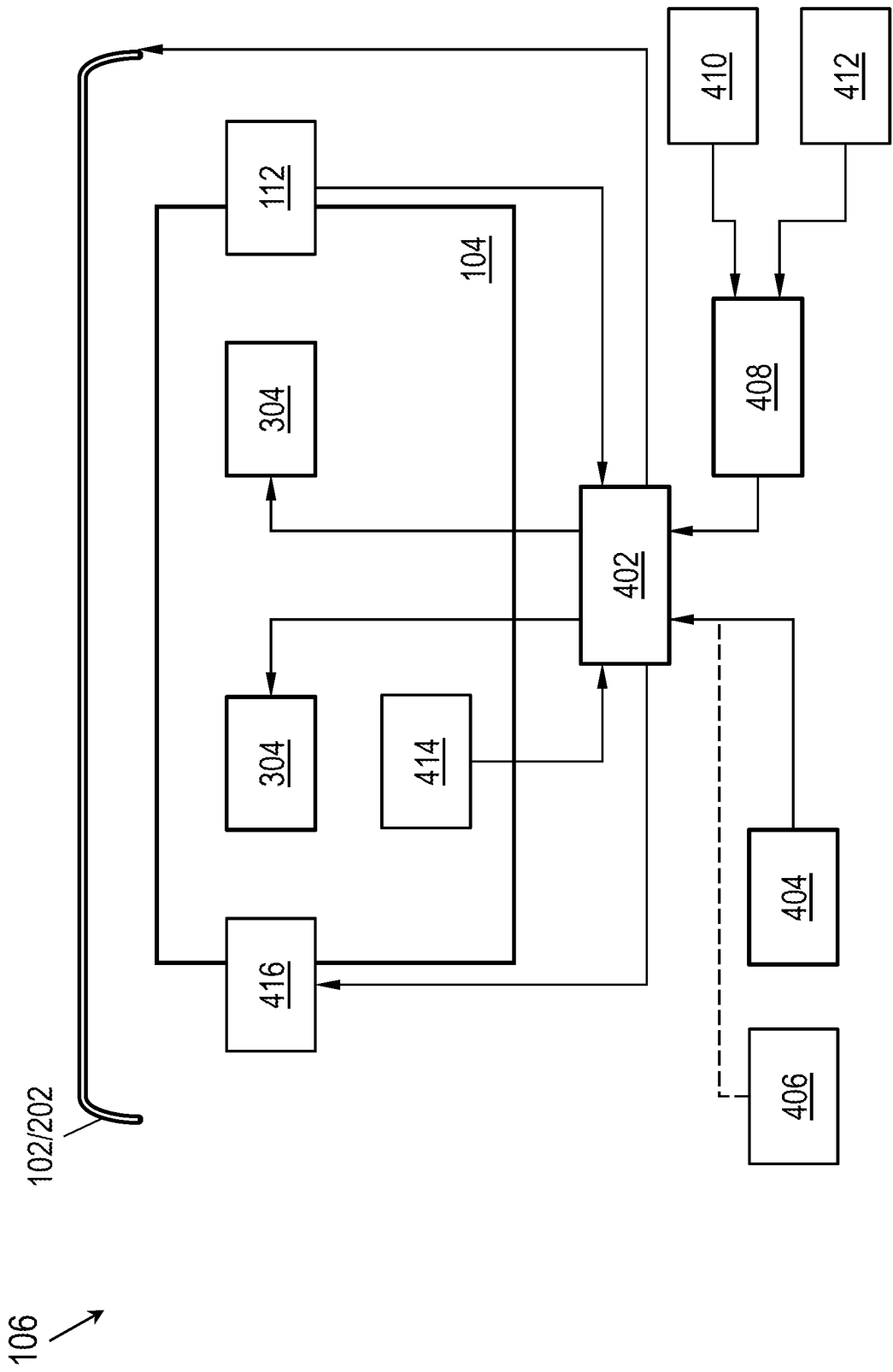

FACEMASK-MOUNTED AUGMENTED REALITY DISPLAY FOR EXTRAVEHICULAR MOBILITY UNIT

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. Provisional Patent Application Ser. No. 63/009,514 entitled FACEMASK-MOUNTED AUGMENTED REALITY DISPLAY FOR EXTRAVEHICULAR MOBILITY UNIT, filed Apr. 14, 2020;

Said U.S. Provisional Patent Application 63/009,514 is herein incorporated by reference in its entirety.

TECHNICAL FIELD

The subject matter disclosed by the instant application is directed generally to extravehicular mobility units and more particularly for visual display units for said extravehicular mobility units.

BACKGROUND

In space, and in other hostile environments where protective gear must be worn, the nature of the protective gear may complicate the incorporation of augmented reality (AR) displays. For example, spacesuits may incorporate an exterior helmet which prevents the user from extending their hand to their face. This is also true with respect to aviation suits, firefighting suits, high-altitude suits, and other similar protective suits which may employ an oxygen mask or smoke mask sealed inside the exterior helmet.

SUMMARY

In a first aspect, a facemask-mounted augmented reality (AR) display device is disclosed. In embodiments, the facemask-mounted AR display device includes a mask or similar breathing apparatus worn on the user's head and partially or fully covering the nose or mouth, the mask disposed behind a transparent visor or other external face shield. The display device is hard mounted to the mask and includes display surfaces aligned with the user's eyes, providing a field of view (FOV) inside that provided by the visor or face shield and moving in alignment with the user's head. The display surfaces are physically or wirelessly connected to a video feed and AR overlay sources, such that the overlay sources are integrated into the video feed by a controller and displayed to the user via the display surfaces.

In some embodiments, the facemask-mounted AR display device includes a microphone within the external face shield. The user can adjust the displayed image stream and/or integrated overlay source via verbal control input spoken into the microphone.

In some embodiments, the facemask-mounted AR display device includes a speaker for providing the user an audio feed associated with the displayed images and/or overlay.

In some embodiments, the facemask-mounted AR display device includes left-side and right-side display surfaces respectively aligned with the user's left and right eyes.

In some embodiments, the display surfaces pivot relative to the breathing apparatus.

In some embodiments, the external face shield includes an electrochromic surface aligned with the user's FOV and adjustably tinted.

In some embodiments, the external face shield partially covers the user's head.

In some embodiments, the external face shield fully covers the user's head and is attachable to a spacesuit or other protective environmental suit worn by the user.

In some embodiments, the facemask-mounted AR display device includes a head tracker for determining head pose data (e.g., a position and orientation of the user's head). The controller can adjust an auxiliary or alternative field of view (FOV) based on the head pose data.

In some embodiments, the overlay source includes suit status data and/or position data of the protective suit.

In some embodiments, the position data includes a position and orientation of the protective suit.

In some embodiments, the overlay source includes suit status data and/or position data for other protective suits (e.g., suits worn by neighboring users).

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 is a block diagram illustrating components of the AR display device of FIG. 1;

DETAILED DESCRIPTION

Figure 1:
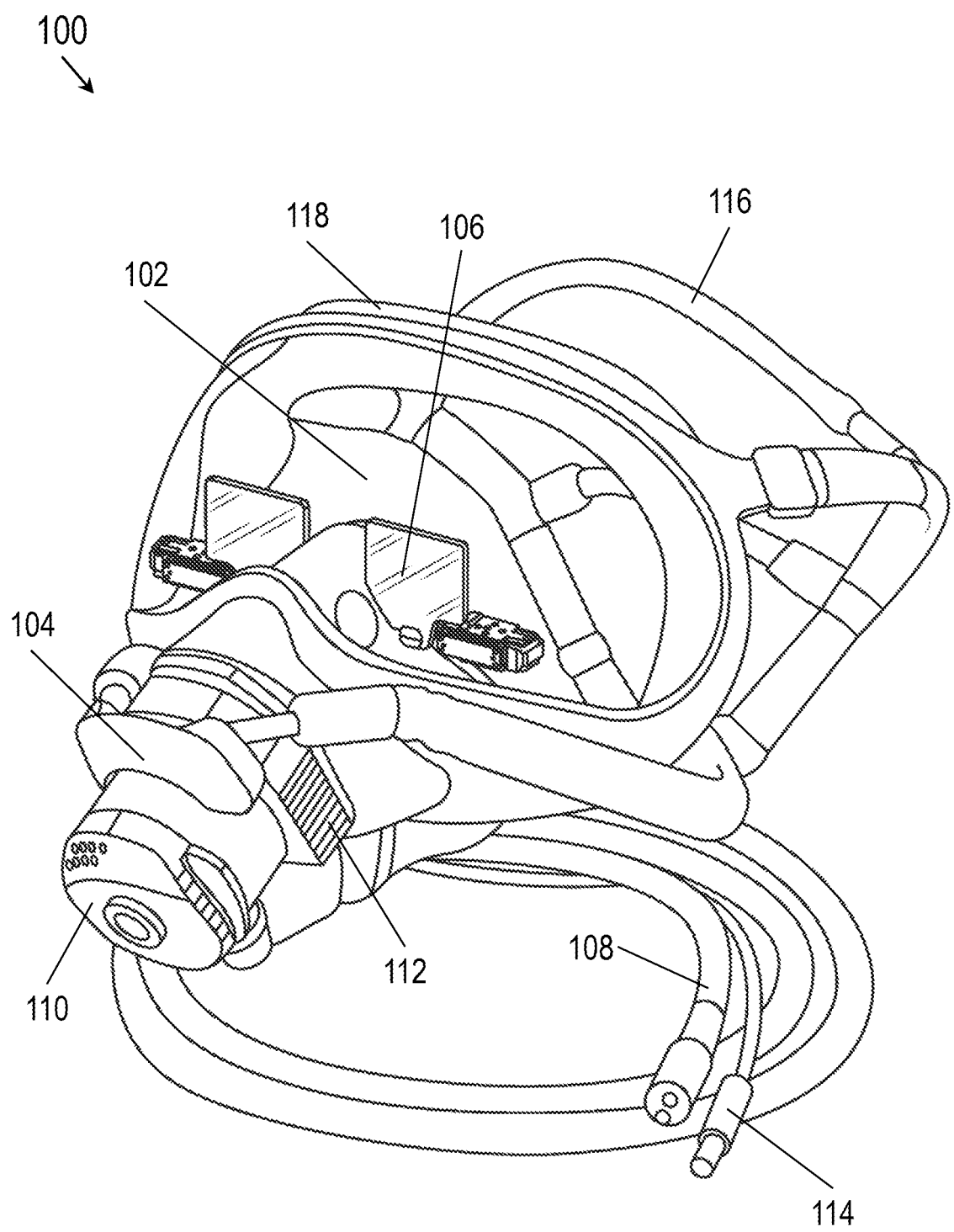
FIG. 1 is an isometric view of a facemask assembly incorporating an augmented reality (AR) display device according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a facemask assembly 100 is disclosed. The facemask assembly 100 may include an external face shield 102, breathing apparatus 104, and augmented reality (AR) display device 106.

In embodiments, the AR display device 106 may be hard-mounted to the breathing apparatus 104, which in turn may fully or partially cover the nose and mouth of the user or wearer. For example, the breathing apparatus 104 may be an oxygen mask for a high-altitude flight suit or a smoke mask for a firefighting suit, wherein the breathing apparatus 104 is connected by an oxygen line 108 to an external oxygen supply (e.g., worn by the user). Similarly, in some embodiments the breathing apparatus may provide for additional external physical connections to the facemask assembly 100. For example, the facemask assembly 100 may include controls 110 for the oxygen supply as well as a speaker or microphone (112), e.g., connected to an external audio source or communications node by cables 114. In some embodiments, content displayed by the AR display device 106 may be supplied thereto by cables 114 or other like physical link. Additionally or alternatively, the AR display device 106 may be wirelessly linked to content sources as described in greater detail below.

In embodiments, the external face shield 102 may include a lens for a mask capable of partially covering the head of the user (e.g., secured thereto by harness 116) and/or adhering to the head or face of the user (e.g., via seal 118). For example, the external face shield 102 may be partially or fully transparent, providing multiple primary fields of view (e.g., forward, left, right, above) for the user. In some embodiments, the external face shield 102 may be a visor projecting in front of the user's head or face, providing shielding or protection for, but not enclosing, the face or head or any portion thereof. The AR display device 106 may move with the breathing apparatus 104 and therefore with the head of the user, continually remaining in the user's forward field of view.

Figure 2:
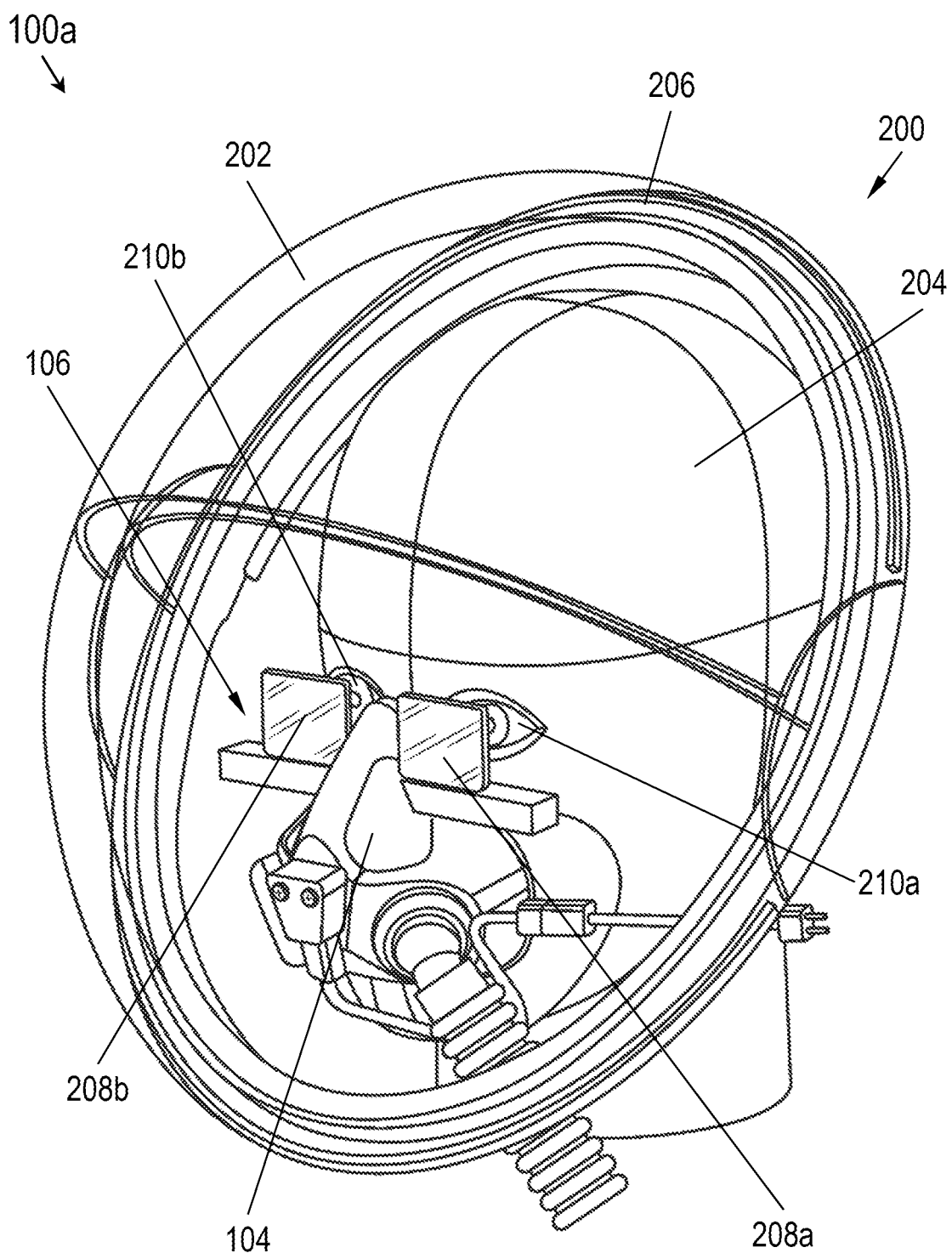
FIG. 2 is an isometric view of a helmet assembly incorporating the AR display device of FIG. 1.

Referring now to FIG. 2, the helmet assembly 100a may be implemented and may function similarly to the facemask assembly 100 of FIG. 1, except that the helmet assembly 100a may include a helmet 200 and external face shield 202 fully covering the head 204 of the user, the helmet 200 and/or external face shield 202 attachable to a spacesuit (e.g., Exploration Extravehicular Mobility Unit (XEMU)), diving suit, decontamination or hazardous materials (hazmat) suit, or other protective environmental suit.

In embodiments, the protective suit may further provide protection against chemicals (hazardous materials) or radiation, may be armored for use in bomb defusion/disarmament, or may be configured for underwater use. In some embodiments, the external face shield 202 may be fixed to the body of the spacesuit such that the external face shield does not move with the head 204 of the user. For example, the external face shield 202 may be mounted to a circular or elliptical bubble ring 206, the bubble ring fixedly mountable to the spacesuit or protective suit. As a result, the helmet 200 and/or external face shield 202 may not move in alignment with the head 204 (e.g., relative to the protective suit). Accordingly, the AR display device 106 may be hard-mounted to the breathing apparatus 104 and move with the breathing apparatus (and, by extension, the head 204) relative to the helmet 200 or protective suit.

In embodiments, the AR display device 106 may include left-side and right-side display units 208ab respectively aligned with the left and right eyes (210a-b) of the user. In some embodiments, the AR display device 106 may include left-side and right-side display surfaces mounted to a single housing extending on either side of the breathing apparatus 104.

Referring to FIGS. 3A through 3D, the AR display device 106 is disclosed. The AR display device 106 may include a mounting and control housing 302 and display surfaces 304.

In embodiments, the left-side and right-side display units 208a-b of the AR display device 106 may be hard-mounted to either side of the breathing apparatus 104. For example, each of the left-side and right-side display units 208a-b may include a mounting and control housing 302 positioned and oriented relative to the left and right eyes 210a-b of the user. The left- and right-side display units 208a-b may be positioned in front of the left and right eyes 210a-b such that the display surfaces 304 mounted on the interior faces of the display units (e.g., proximate to the left and right eyes 210*a-b*) substantially fill the forward field of view of the user.

In embodiments, the mounting and control housings 302 may include control processors and wireless transceiver equipment capable of wirelessly receiving image streams (e.g., single or merged video feeds) and/or augmented reality overlay content (e.g., synthetic vision, enhanced vision, symbology, graphics) superimposed on the image streams and presented to the user via the display surfaces 304.

Figure 3A:
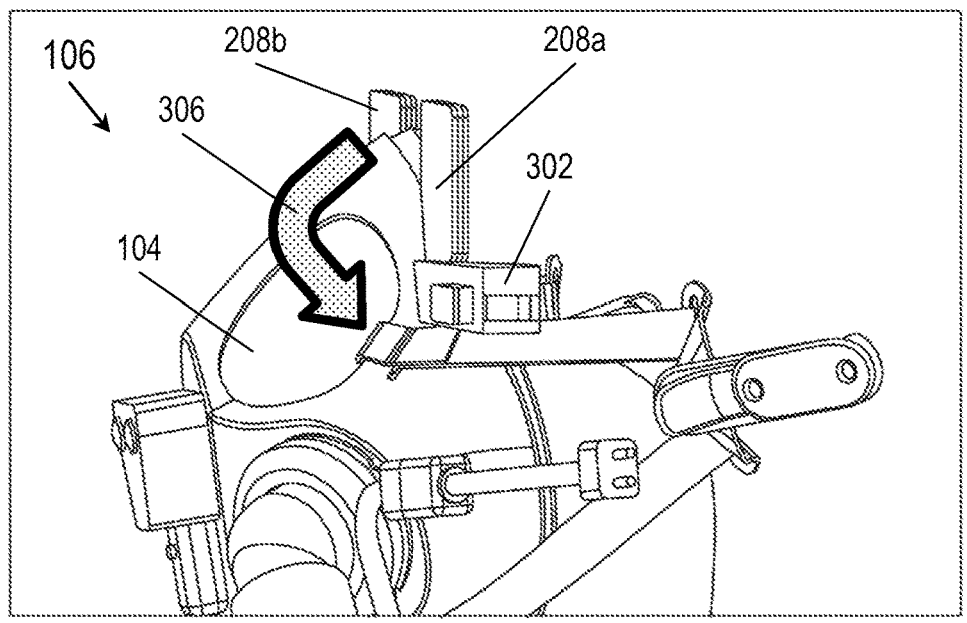
FIG. 3A is a profile view illustrating the AR display device of FIG. 1.
Figure 3B:
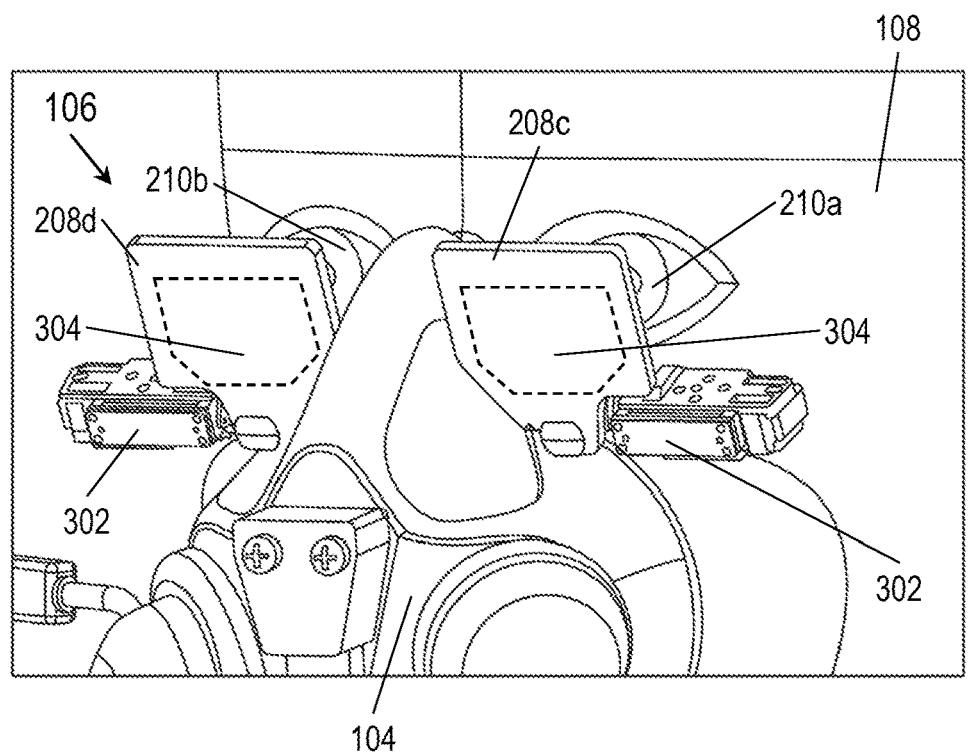
FIG. 3B is a forward isometric view of the AR display device of FIG. 3A in an alternative orientation.
Figure 3C:
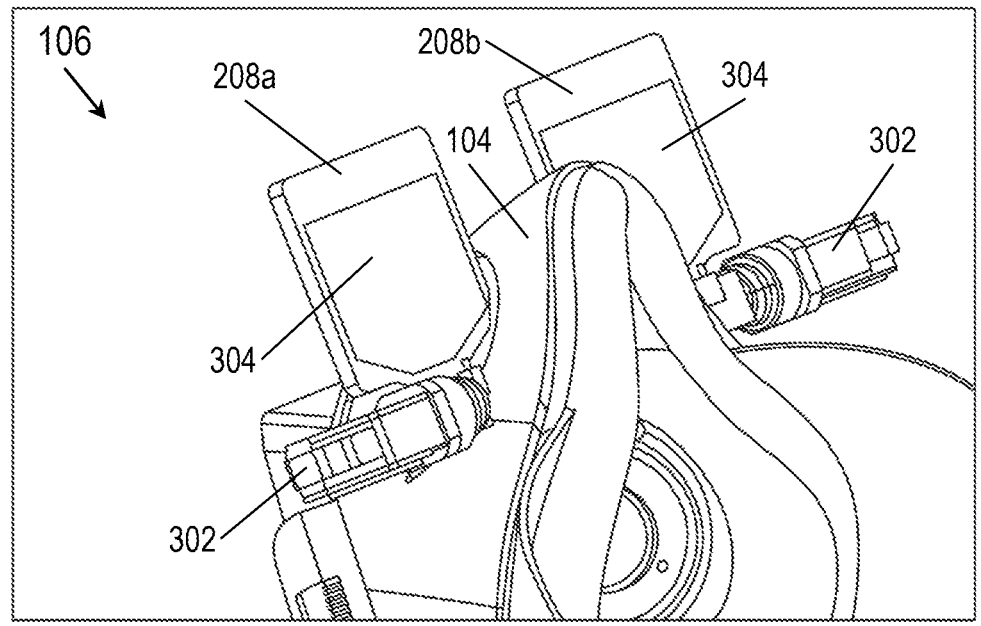
FIG. 3C is a rear isometric view of the AR display device of FIG. 3A.
Figure 3D:
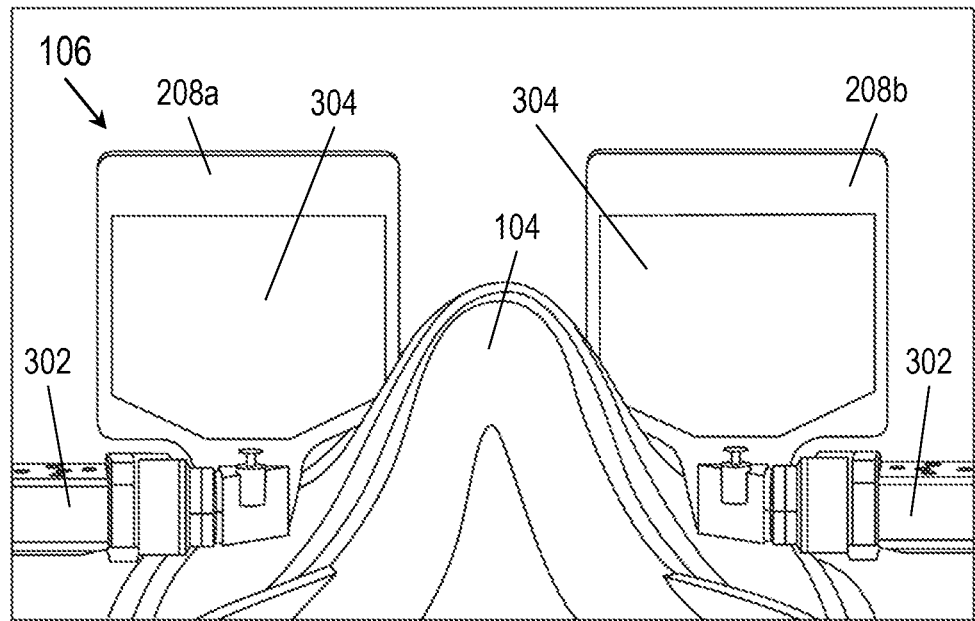
FIG. 3D is a rear view of the AR display device of FIG. 3A.

Referring in particular to FIGS. 3A and 3B, the left-side and right-side display units 208*c-d* of FIG. 3B may be implemented and may function similarly to the left-side and right-side display units 208*a-b* of FIG. 3A, except that the left-side and right-side display units 208*c-d* may be capable of tilting or pivoting (306, FIG. 3A) relative to the breathing apparatus 104 (e.g., adjustable for more than one user). For example, the left-side and right-side display units 208*c-d* may be capable of pivoting up to 30 degrees relative to the substantially vertical orientation of the left-side and right-side display units 208*a-b* shown by FIG. 3A.

Referring now to FIG. 4, the AR display device 106 is disclosed.

In embodiments, the AR display device 106 may include a controller 402 incorporating control processors for managing the video feeds and overlay content presented to the user via the display surfaces 304. For example, the controller 402 may receive (e.g., wirelessly or via physical link) a base video feed 404 for display via the display surfaces 304. The base video feed 404 may incorporate image streams from a visible-light camera or image sensor, e.g., a camera forward-mounted to a protective suit and covering a field of view substantially similar to that provided by the external face shield 102/202. In some embodiments, the base video feed 404 may be merged with (or replaced by) other streaming image content, e.g., thermal or long-wave infrared (LWIR) imagery 406, or cameras associated with other fields of view (e.g., aft-facing).

In embodiments, the AR display device 106 may include graphics generators 408 (e.g., graphics generation processors). For example, the graphics generators 408 may receive other relevant data and generate therefrom overlay content for incorporation into (e.g., superimposition on) the base video feed 404. The graphics generators 408 may be in communication with control processors of a spacesuit or protective suit and receive therefrom suit status data (410), e.g., power and consumables levels, component performance data, and position data (e.g., an absolute or relative position of the spacesuit).

In embodiments, the graphics generators 408 may receive additional external data 412 from sources external to the AR display device 106. For example, the external data 412 may include performance data and levels for other proximate spacesuits. In some embodiments, if the user (or spacesuit) is one of several users/spacesuits operating proximate to a lander vehicle or other base, the external data may include levels or position data of the lander/base, such that the AR display device 106 may determine a position or orientation of the user relative to the lander/base.

In some embodiments, the AR display device 106 may incorporate a head tracker 414 capable of determining a current pose (e.g., position and orientation) of the head (204, FIG. 2) of the user (e.g., relative to a pose of the spacesuit or to some other base vehicle or facility of known position). The controller 402 may account for the current pose when displaying AR content via the display surfaces 304, e.g., shifting or changing content to account for a change in pose.

In some embodiments, the AR display device 106 may incorporate speakers 416 to provide the user with integrated audio corresponding to the displayed AR content. Similarly, the AR display device 106 may incorporate a microphone 112 (e.g., incorporated into the breathing apparatus 104) for receiving verbal commands from the user. For example, the AR display device 106 may be trained to recognize and respond to the voice of the user, and may learn to execute basic functions in response to recognized verbal control input from the user (e.g., changing the base video feed 404, changing the overlay content).

In some embodiments, the external face shield 102 may be fully or partially electrochromic and adjustable via the controller 402, such that the user may enhance the visibility of the display surfaces 304 by adjusting a tint level of the external face shield.

Figure 5:
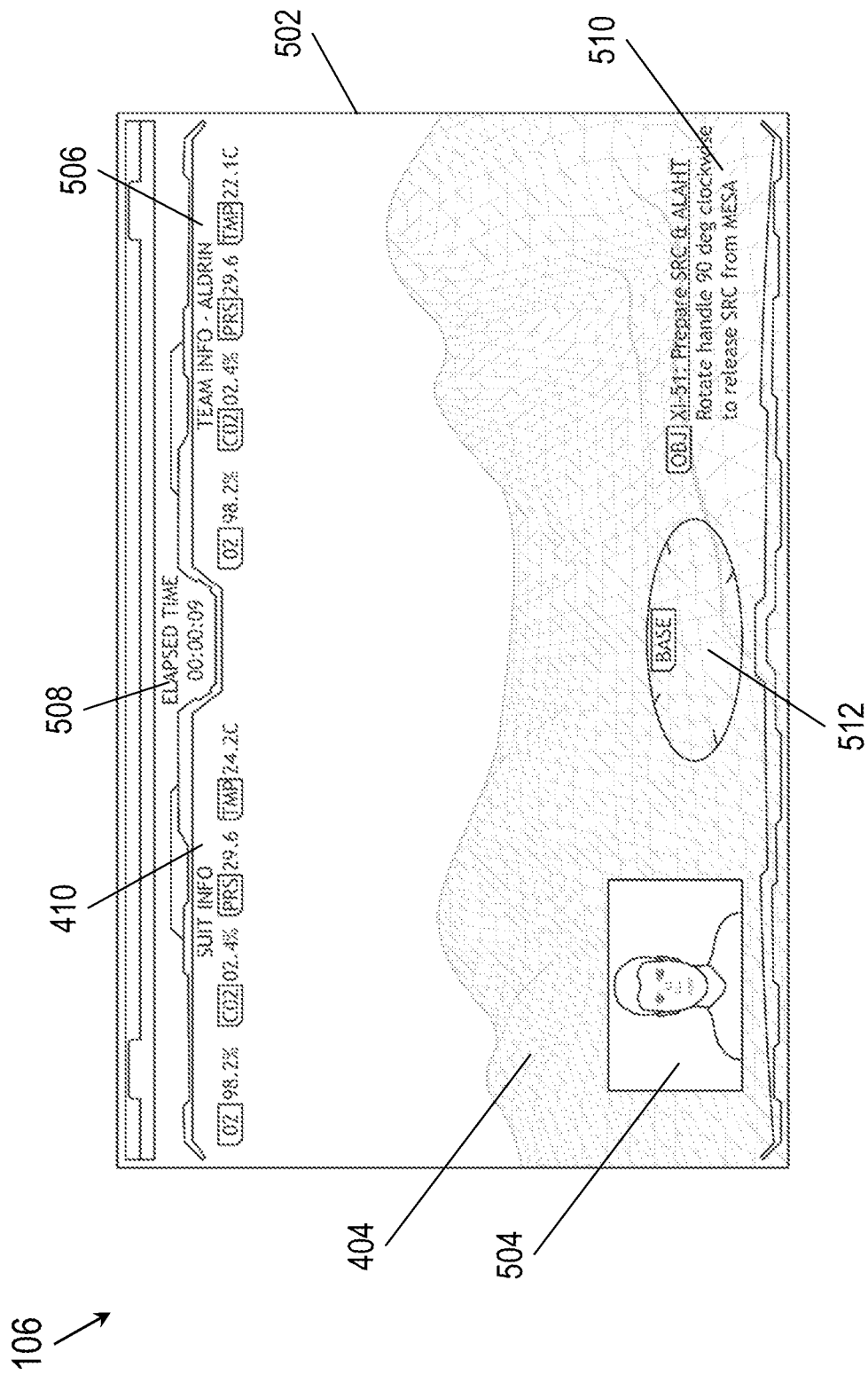
FIG. 5 is a user view of the AR display device of FIG. 1.

Referring to FIG. 5, the AR display device 106 is shown.

In embodiments, the AR display device 106 may display, via the display surfaces (304, FIG. 4), an AR display 502 comprising the base video feed 404 with various elements of overlay content integrated thereinto or superimposed thereon. For example, the base video feed 404 may reflect a substantially forward field of view with respect to the spacesuit and may incorporate enhanced vision elements, synthetic vision elements, or merged video feeds (e.g., thermal/LWIR imagery (406, FIG. 4). An auxiliary video feed 504 may be superimposed over the base video feed 404 (e.g., an alternative field of view, additional video content).

In embodiments, suit status data 410 and external data (412, FIG. 4) may be presented to the user via overlay content. For example, the AR display 502 may incorporate real-time suit status data 410, e.g., oxygen and carbon dioxide ($CO_2$) levels, suit pressure, and temperature. Similarly, the AR display 502 may incorporate external data 412, e.g., real-time suit data from other spacesuits (506) elapsed mission time (508), messages from mission control (510), and relative position of the spacesuit (512), e.g., relative to a base or lander vehicle. In some embodiments, overlay content displayed at any particular moment may be adjusted or changed by the user (e.g., via manual control panel elsewhere on the spacesuit or via verbal control input).

CONCLUSION

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A facemask-mounted augmented reality (AR) display device, comprising:

a breathing apparatus configured to be worn on a head of a user behind an external face shield and to at least partially cover one or more of a nose and a mouth of the user and to be attached to a first protective suit worn by the user, the breathing apparatus capable of moving with the head and the external face shield configured to provide at least one first field of view (FOV) to the user; and an augmented reality (AR) display system mounted to the breathing apparatus and comprising one or more display surfaces aligned with at least one eye of the user, the one or more display surfaces configured to provide at least one second FOV to the user, the second FOV within the first FOV, the AR display system operatively coupled to one or more of an image stream and an overlay source, the AR display system including a controller configured to:

display the image stream to the user via the one or more display surfaces; and integrate the at least one overlay source into the displayed image stream;

wherein the at least one overlay source includes:

at least one of status data or position data associated with the first protective suit; and at least one of status data or position data associated with at least one second protective suit.

2. The facemask-mounted AR display device of claim 1, further comprising:

at least one microphone disposed within the external face shield and communicatively coupled to the controller, the controller configured to:

receive verbal control input from the user via the microphone; and adjust, based on the received verbal control input, one or more of the displayed image stream or the integrated overlay source.

3. The facemask-mounted AR display device of claim 1, further comprising:

at least one speaker operatively coupled to the controller, the speaker configured to provide the user with at least one audio feed associated with one or more of the displayed image stream or the integrated overlay source.

4. The facemask-mounted AR display device of claim 1, wherein the one or more display surfaces include:

a left-side display surface aligned with a left eye of the user; and a right-side display surface aligned with a right eye of the user.

5. The facemask-mounted AR display device of claim 1, wherein the one or more display surfaces are configured to pivot relative to the breathing apparatus.

6. The facemask-mounted AR display device of claim 1, wherein:

the external face shield includes at least one electrochromic surface associated with the at least one first FOV, the electrochromic surface operatively coupled to the controller; and the controller is configured to adjust a tint setting of the electrochromic surface.

7. The facemask-mounted AR display device of claim 1, wherein the external face shield is configured to partially cover the head of the user.

8. The facemask-mounted AR display device of claim 1, wherein:

the external face shield is configured to fully cover the head of the user.

9. The facemask-mounted AR display device of claim 1, further comprising:

at least one head tracker operatively coupled to the controller, the head tracker configured to determine at least one of a head position or a head orientation corresponding to the head of the user; and wherein the controller is configured to adjust the at least one second FOV relative to one or more of the head position or the head orientation.

10. The facemask-mounted AR display device of claim 1, wherein:

the position data is associated with one or more of a suit position or a suit orientation corresponding to the protective suit; and the head position and the head orientation are relative to one or more of the suit position or the suit orientation.

* * * * *